(12) United States Patent
Sadahiro

(10) Patent No.: US 6,237,136 B1
(45) Date of Patent: *May 22, 2001

(54) SYSTEM AND METHOD FOR AUTOMATICALLY CREATING SOURCE CODE EXAMPLE FILES FOR AN APPLICATION PROGRAM IN A PLURALITY OF PROGRAMMING LANGUAGES

(75) Inventor: Ken Sadahiro, Austin, TX (US)

(73) Assignee: National Instruments Corporation, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,592

(22) Filed: Dec. 2, 1997

(51) Int. Cl.[7] .................................................. G06F 9/45
(52) U.S. Cl. ........................................ 717/2; 717/1; 717/3
(58) Field of Search ..................................... 395/702, 703; 717/2, 3, 1

(56) References Cited

U.S. PATENT DOCUMENTS

| | | | | |
|---|---|---|---|---|
| 4,827,404 | * | 5/1989 | Barstow et al. ....................... | 395/500 |
| 5,159,687 | * | 10/1992 | Richburg ............................... | 395/702 |
| 5,187,788 | * | 2/1993 | Marmelstein .......................... | 395/703 |
| 5,675,801 | * | 10/1997 | Lindsey ................................. | 395/702 |
| 6,070,007 | * | 5/2000 | Simonyi ................................ | 395/702 |

OTHER PUBLICATIONS

Brazile. A System for Program Component Spcification and Code Generation. ACM. pp. 904–910, 1992.*
Castelluccia et al. Generating Efficient Protocol Code From an Abstract Specification. ACM. pp. 514–524, Aug. 1997.*

* cited by examiner

*Primary Examiner*—Kakali Chaki
*Assistant Examiner*—Wei Zhen
(74) *Attorney, Agent, or Firm*—Conley, Rose & Tayon PC; Jeffrey C. Hood

(57) ABSTRACT

A system and method for generating source code example files for an application program in a computer system. In the preferred embodiment, the system and method is used for creating source code example files for the NI-DAQ driver software from National Instruments. The user first generates a code flow description file. The code flow description file is written in a code flow description language which is independent of a plurality of programming languages, i.e., which includes only common programming elements from the plurality of programming languages. The user then specifies one or more target programming languages. The present invention includes a Code Generator which generates one or more target example source code files in the specified target programming languages in response to the code flow description file. The Code Generator operates to parse the code flow description file to produce a code flow description data structure, and then generate the one or more target example source code files in the specified target programming languages in response to the code flow description data structure. The user can thus easily create a number of source code example files for a plurality of different programming languages and/or for a plurality of different operating systems.

39 Claims, 7 Drawing Sheets

SYSTEM AND METHOD FOR AUTOMATICALLY CREATING SOURCE CODE EXAMPLE FILES FOR AN APPLICATION PROGRAM IN A PLURALITY OF PROGRAMMING LANGUAGES

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

BACKGROUND

1. Field of the Invention

The present invention relates to a system and method for automatically generating source code example files for an application program, wherein source code example files are automatically generated for a plurality of different programming languages and/or a plurality of different operating systems.

2. Description of the Related Art

Many application programs are distributed with examples which illustrate or exemplify operation of the application program. In many instances, the application program includes examples in a number of different programming languages. For example, NI-DAQ, the device driver and Windows driver library set for National Instruments Data Acquisition (DAQ) devices, is generally distributed with code examples in Microsoft Visual C++, Microsoft Visual Basic, and Borland C++.

In the NI-DAQ application program, the code examples generally had the following characteristics. First, each example included extensive Windows graphical user interface (GUI) code, so that the user could easily change key data acquisition parameters while running the example program. Second, each example accommodates a wide variety of DAQ devices. However, not all devices were supported by all NI-DAQ functions. Therefore, each example implemented run-time branching to make device specific function calls. Thirdly, each example was written individually for each language and three different Windows operating system (OS) versions (3.1x, 95, and NT), each taking advantage of the programming language specific features through language and OS specific project files. Finally, each example was delivered in the form of source code and ready-to-run executables.

While each delivered example illustrated an important aspect of using the NI-DAQ dynamic link library (DLL) through the exported application programming interface (API) calls, they had the following shortcomings with respect to the above mentioned characteristics. First, it was very difficult to find the few NI-DAQ function calls located in the few hundred lines of GUI code. In one example, there were 340 lines of code, which only included 2 lines of NI-DAQ function calls. Thus the NI-DAQ programming example resembled a Windows programming tutorial. Secondly, when the NI-DAQ driver set was upgraded to include support for new data acquisition (DAQ) devices, a programmer had to maintain the different versions of the examples for each programming language and OS. Thirdly, when a new version of the programming language was released (e.g.: Microsoft Visual C++ 5.0), the project files were required to be upgraded due to compatibility issues. Also, each example used slightly different sequences of function calls, which required that support personnel know the subtle differences between the examples. Fourthly, the size of the executables and/or run-time engines (e.g. the Visual Basic 3.0 run-time DLL is over 700 kB) required to run the executables required increased amounts of disk space for the installation media (1.44 MB floppies). Fifthly, the examples included no information on how physical signals were to be connected to the data acquisition devices while being used with these examples.

Finally, customers typically requested "code snippets", which are concisely written source code files showing how to perform a certain task. The customer support engineers were thus required to spend time writing these short examples for customers.

Due to the above shortcomings and the large amount of required maintenance for the example source code, application developers were reluctant to provide a large number of examples to the users. The NI-DAQ library is a versatile driver library which supports over 50 different DAQ devices and signal conditioning units, as well as a wide variety of tasks for each DAQ device. Although the NI-DAQ User Manual did explain in flow charts how to use the set of NI-DAQ functions to perform various basic data acquisition tasks, the nature of the API calls required detailed expertise when it came to programming. Without examples, customers had a very difficult time programming with the NI-DAQ function calls.

Therefore, an improved system and method is desired for easily generating example programs for an application program, preferably in a plurality of different programming languages and/or for a plurality of different operating systems.

SUMMARY OF THE INVENTION

The present invention comprises a system and method for generating example source code files for an application program in a computer system. In the preferred embodiment, the system and method is used for creating source code example files for the NI-DAQ driver software from National Instruments.

The developer first generates a code flow description file. The code flow description file is written in a code flow description language which is independent of a plurality of programming languages, i.e., which includes only common programming elements from the plurality of programming languages. The developer then specifies one or more target programming languages. The present invention includes a Code Generator which generates one or more target example source code files in the specified target programming languages in response to the code flow description file. The Code Generator operates to parse the code flow description file to produce a code flow description data structure, and then generate the one or more target example source code files in the specified target programing languages in response to the code flow description data structure.

In one embodiment, the system further includes a program editor for creating the code flow description files. The system further comprises a function database which stores functions of the application program written in the code flow description language. The function database is useable in creating the code flow description file.

Thus, one object of the present invention is to easily create a large collection of examples that illustrate only a single basic data acquisition task, and reduce GUI code to a bare minimum.

Another object of the present invention is to have all of the examples of the same basic data acquisition task call the same sequence of NI-DAQ functions, so that an end user can examine an example in one language (e.g. Visual C++), and expect the same exact functionality from a counterpart example written in another programming language (e.g. Visual Basic).

Another object of the present invention is to simplify the programming style of example programs to accommodate a wide range of programming expertise levels among end users.

Another object of the present invention is to create source code program files which provide sufficient and consistent documentation elements in the example source code itself regarding what the example does, what functions it uses, its key parameters, and what signal connections to the DAQ device are necessary. It is also an object to allow comments in the source code to explain any special tips and techniques in that part of the source code.

Another object of the present invention is to reduce the storage space required by the installation media by providing only the files necessary to compile the source code into executable programs, but not the executables themselves.

Another object of the present invention is to maintain the example code flow in a single database file for ease of maintenance, so that the single database file could then be used to generate other types of files, such as on-line help documentation, file lists, etc.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
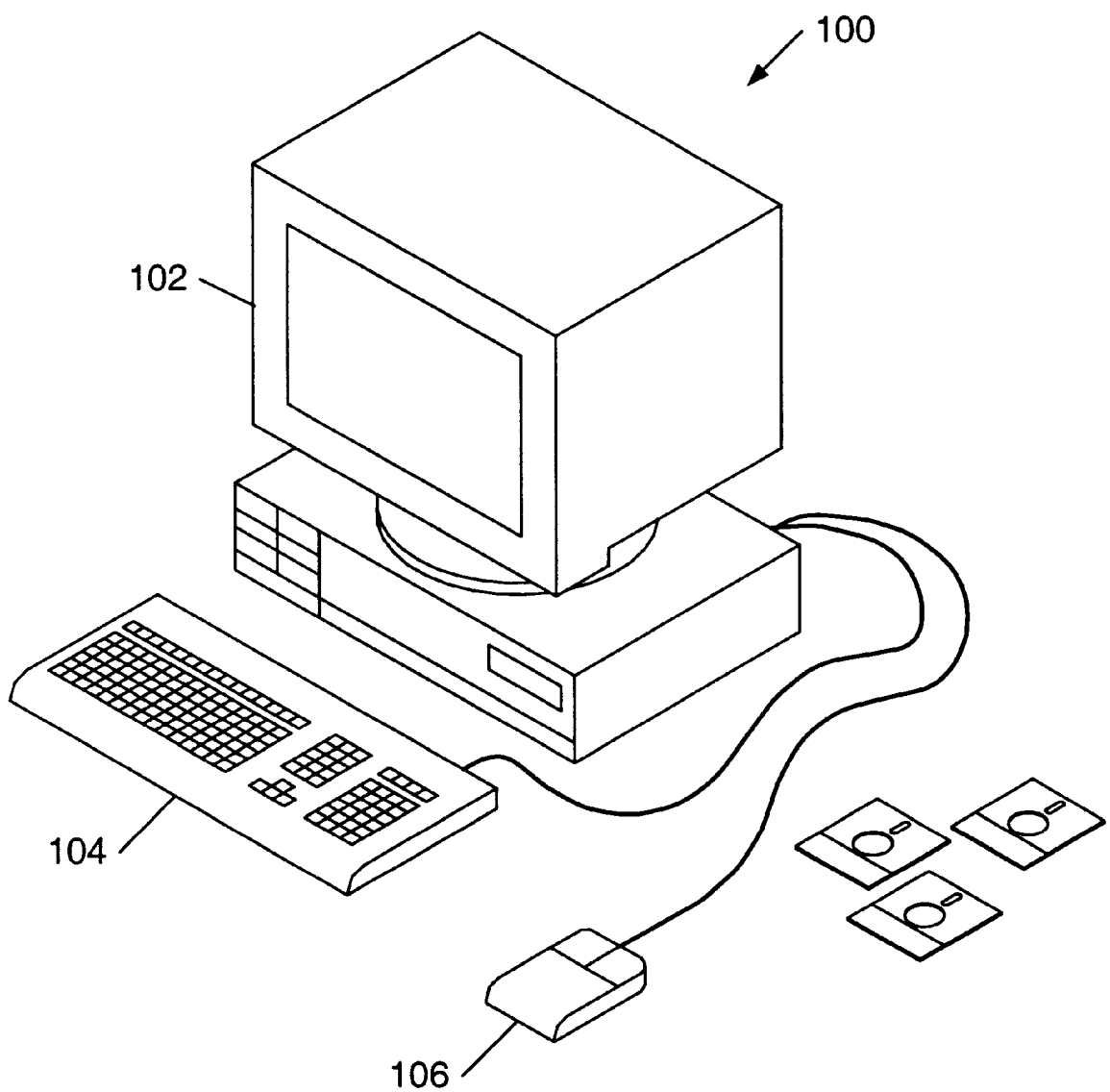
FIG. 1 illustrates a computer system utilizing the present invention.

Referring now to FIG. 1, an illustrative computer system 100 which is programmed according to the present invention and which operates according to the present invention is shown. The computer system 100 preferably comprises a video display screen 102, a keyboard 104, and a mouse 106 as shown. The computer system 100 also includes various standard components, including at least one central processing unit (CPU), a memory, a hard drive, one or more buses, and a power supply. The computer system 100 preferably includes a memory media, such as an installation media, e.g., floppy disk(s) or a CD-ROM, a system memory and/or a non-volatile memory, e.g., a hard drive, on which computer programs according to the present invention are stored. In the preferred embodiment, the present invention comprises a software program stored on the memory and/or hard drive of the computer 100 and executed by the CPU. The CPU executing code and data from the memory thus comprises a means for executing the steps described below. The computer system 100 may thus be used to create source code example programs or files according to the present invention, as described below.

Figure 2:
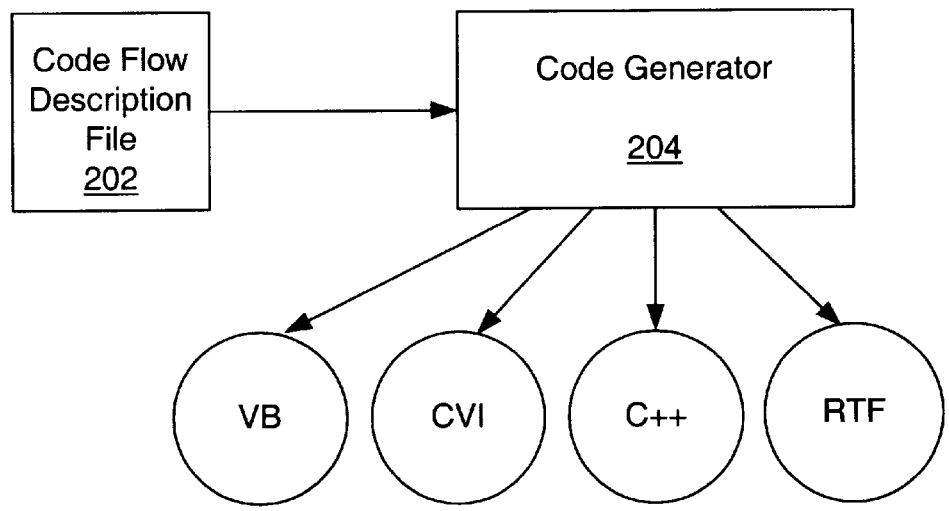
FIG. 2 illustrates the operation of the code generator of the present invention.

FIG. 2—Software Components

FIG. 2 illustrates the software components comprising the system and method of the present invention. As shown, the user creates a code flow description file 202 in a code flow description language. The code flow description file 202 specifies the example to be created in a pre-defined format, i.e., the code flow description language. The code flow description language is preferably a generic to a plurality of different programming languages and/or operating systems. Stated another way, the code flow description language incorporates the core or common programming constructs from each of the a plurality of different programming languages. The syntax of the code flow description language is discussed in greater detail below.

Once the user creates the code flow description file 202, the code flow description file is provided to a Code Generator 204. The Code Generator 204 analyzes the code flow description file 202 and is operable to create one or more source code examples in selected programming languages and/or for selected operating systems. In FIG. 2, the examples shown comprise the Code Generator 204 generating C source code example programs for Visual Basic, LabWindows CVI, Microsoft Visual C++, Borland C++, and an RTF file.

As discussed further below, in the preferred embodiment the Code Generator 204 operates to parse the code flow description file to create a code flow data structure. The Code Generator 204 then operates to convert the code flow data structure into each of the different examples for the different programming languages. This conversion utilizes the specific syntax rules required for each of the specific programming languages.

In the preferred embodiment the code flow description file includes a plurality of code flow segments or records. The Code Generator 204 operates to parse the code flow segments in the code flow description file to create corresponding code flow data structures for each segment. The Code Generator 204 then operates to convert the code flow data structures into each of the different examples for the different target programming languages.

Figure 3:
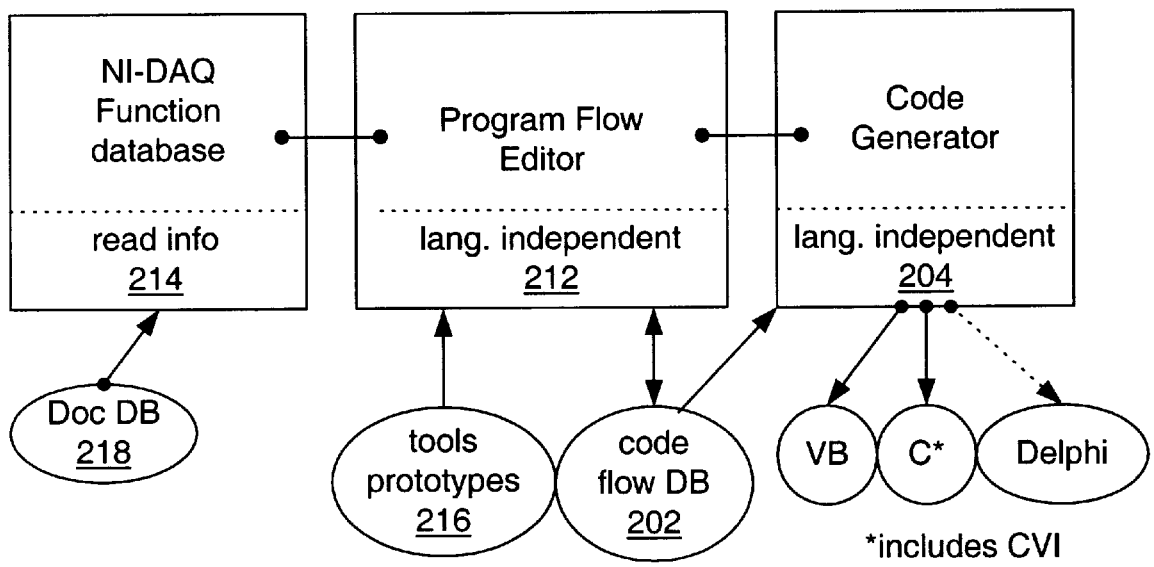
FIG. 3 illustrates various software components comprised in the preferred embodiment of the present invention.

FIG. 3—Software Components of the Preferred Embodiment

FIG. 3 illustrates a preferred embodiment of the invention. In FIG. 3, the system and method of the present invention further includes a program flow editor 212 which is useable for creating code flow description files 202 utilizing the code flow description language.

The system and method preferably also includes a function database 214 which stores code flow segments for functions currently available in the application program for which examples are being created. The function database 214 comprises a database of functions written in the code flow description language which are used by the program flow editor in creating code flow description files. Since it is presumed that these functions will be repetitively used in each of the code flow description files being created, the database 214 is provided to help the user to insert these functions, pre-written in the code flow description language, directly into a code flow description file being generated. This simplifies development of the code flow description files. Also, if the application program function changes in the future, it is only necessary to replace the function database 214. This allows additional reuse of existing code flow description files. In one embodiment, the program editor includes search and replacement tools for search and replacement of certain function calls, and thus existing code flow description files are not rendered obsolete when the function database 214 changes.

The function database 214 receives information from a Documentation Database 218 which describes other current information relative to the application program. The Documentation Database 218 contains a list of functions exported by the application program. The Documentation Database 218 comprises function names, parameters, types, parameter lists, whether or not a certain function is exported or not exported, whether or not it is documented, etc. This information is referenced by the Function Database 214 and is also used by the program flow editor 212 in creating code flow description files.

Where the application program for which examples are being created is the NI-DAQ driver application from National Instruments, the system and method preferably includes an NI-DAQ function database 214 which stores code flow segments for NI-DAQ functions available in the current release of the NI-DAQ driver software. The NI-DAQ function database 214 receives information from a document database 218 which describes other current information relative to the NI-DAQ software. The program flow editor 202 is operable to use the code flow segments in the function database to form program code flow segments within the code flow description file. The Documentation Database 218 contains a list of functions that NI-DAQ exports.

The code flow editor 202 further uses tools and prototypes 216 to aid in creating code flow description files. The program flow editor tools and prototypes 216 comprises a list of code flow definition segments or files written for functions that each example program may call, but which are not necessarily part of the function database 214. For instance, the set of examples contains a set of function calls such as NI-DAQErrorHandler and NI-DAQDelay, which have their own prototypes. However, these functions are not known as NI-DAQ API functions and thus are not included in the function database 214. Thus the tools and prototypes 216 allows the user to incorporate external functions, i.e., functions external to the application program, e.g., non-NI-DAQ functions, into the code flow description file.

As shown, the program flow editor 212 is used to create a code flow description file 202. The code flow description file is then provided to the Code Generator 204 for creation of the various example programs and/or documentation.

The present invention thus comprises a Code Generator 204 which analyzes a code flow description file and is operable to generate various example programs in selected programming languages and/or for selected operating systems. The present invention further includes a novel code flow description language for creating code flow description files. The present invention further includes a program flow editor which is used to aid in creating code flow description files. The present invention thus provides a suite of example creation or generation tools which are operable to easily create example programs and documentation. The system and method of the present invention are operable to create a large collection of source code examples simply and efficiently.

In the preferred embodiment, where the application program is the NI-DAQ driver level software, the present invention allows the creation of a large collection of examples that illustrate a single basic data acquisition task and which also reduces GUI code to a minimum.

The present invention also operates to make all examples of the same basic data acquisition task call the same sequence of functions, such as NI-DAQ functions. Thus, an end user can examine the example in one language, e.g., Visual C++ and expect the same exact functionality from a counterpart example written in another programming language, e.g., Visual Basic. Thus, the present invention provides consistency in examples over a plurality of different programming languages.

The present invention further simplifies the programming style in which the example programs are written to accommodate a wide range of programming expertise levels among end users.

The present invention fisher provides sufficient and consistent documentation elements in the example source code itself regarding what the example does and the functions that the example uses, as well as its key parameters. For the NI-DAQ application program, the present invention also provides documentation on what signal connections to the DAQ device are necessary. Also, the present invention inserts comments in the source code to explain any special tips and techniques in their respective sections of the source code.

The present invention further reduces the storage space required by the installation media, since the present invention enables the developer to provide only the files necessary to compile the source code into executable programs, and thus does not require the executables themselves.

The system and method of the present invention is also operable to maintain the example code flow description files in a single database file for ease of use and maintenance. Further, this database of example code flow description files can also be used to generate other types of files such as online help documentation, file lists, etc.

Figure 4:
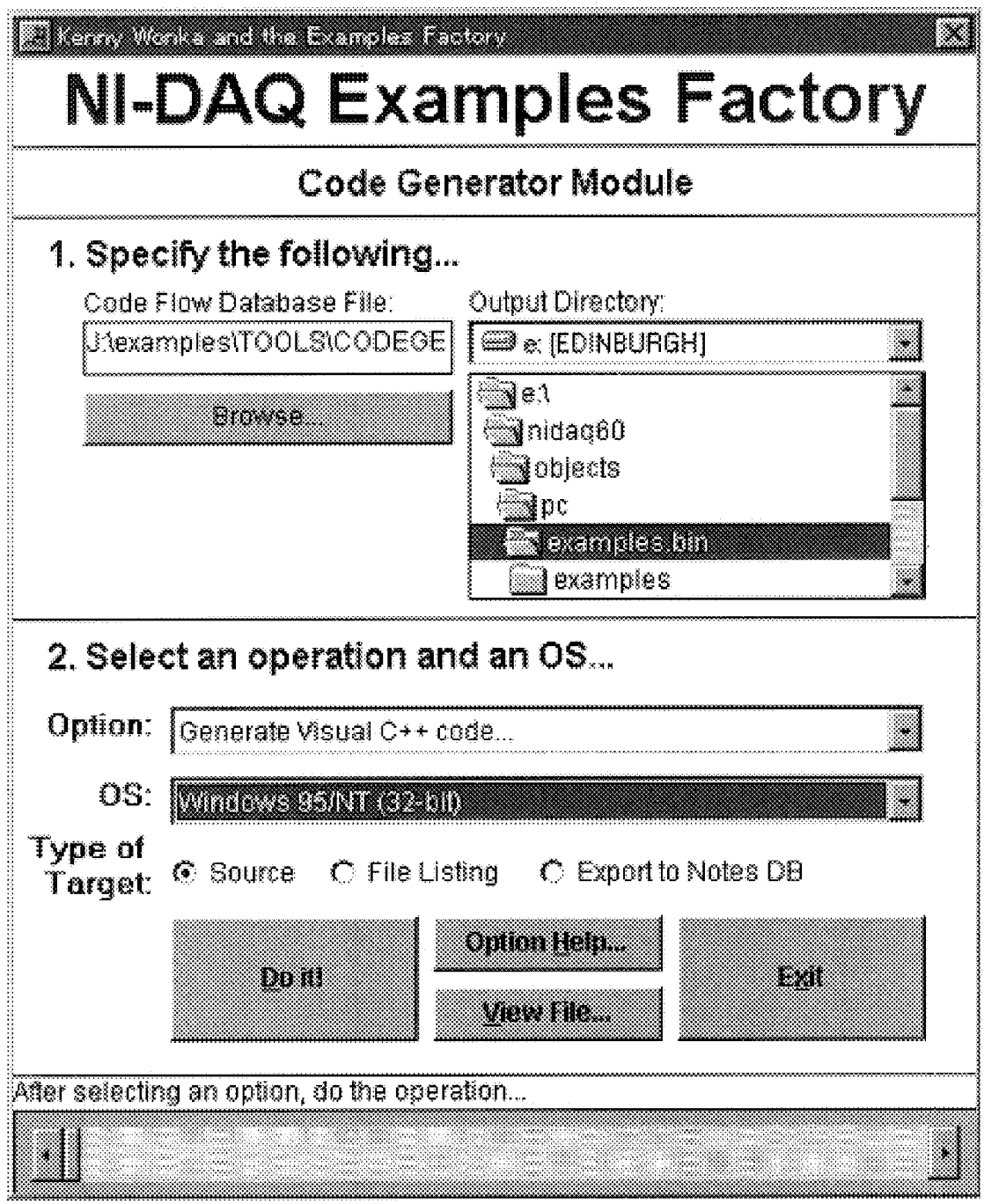
FIG. 4 is a screen shot illustrating use of the generator according to the present invention.

FIG. 4—Screen Shot of the Examples Factory Code Generator

FIG. 4 is a screen shot of the Examples Factory Code Generator of the preferred embodiment. The Examples Factory Code Generator reads in a code flow description (CFD) file and generates different types of target files. As shown, when the Code Generator is executed, the following options are specified:

one Code Flow Definitions File one target directory—base directory where the generated files will be stored one target language—target programming language for generated files one operating system—target operating system for generated files type of target—source files, file listing, or examples spreadsheet file After the above selections have been specified, the user clicks on the Do It! button to start generating the target files.

Code Flow Segments

The code flow definition file includes a collection of code flow segments. A sample code flow segment appears as follows. (The syntax is explained in more detail later).

```
;----------------------------------------------------------
; 1ch 1pt - immediate
BeginCodeFlow
    Filename:    AI1Pt
    Descr:   Read one channel, one point at a time, immediately
    TaskIDList:  1PT, 1CH, IMMED
    Category:    AI
    PinConnInfo:  Connect your analog signal to AI channel 1. @
        The default analog input mode for the DAQ device will be used.
{
    Var: I16, iStatus, 0, False
    Var: I16, iRetVal, 0, False
    Var: i16, iDevice, 1, False
    Var: I16, iChan, 1, True
    Var: I16, iGain, 1, False
    Var: F64, dVoltage, 0.0, False
    Var: I16, iIgnoreWarning, 0, False
Func: AI_VRead, iStatus
{
    Param: iDevice
    Param: iChan
    Param: iGain
    Param: dVoltage, *
}
Func: NIDAQErrorHandler,iRetVal
{
    Param: iStatus
    Param: "AI_VRead"
    Param: iIgnoreWarning
}
Func: IF
{
    Cond: iStatus, EQ, 0, LAST
}
        Func: PRINT
        {
            Param: The voltage at AI channel, CONST
            Param: iChan, 116
            Param: is, CONST
            Param: dVoltage, F64
            Param: volts., CONST
        }
    Func: ENDIF
}
EndCodeFlow
```

If the user of the Examples Factory Code Generator selects a C language (e.g. LabWindows/CVI, Microsoft Visual C++, Borland C++) for any operating system, the code flow definition listed above is translated as follows. Here note the common elements between the example below and the code flow definition above.

```
/************************************************************
*
* Example program:
*    AI1Pt.c
*
* Description:
*    Read one channel, one point at a time, immediately
*
* Example Category:
*    AI
*
* Example Task Types:
*    1PT, 1CH, IMMED
*
* List of key parameters:
*    iChan
*
*    [Since variables are hardcoded, there is no guarantee that this
*    program will work for your setup. This example is simply
*    presented as a code snippet of how you can use NI-DAQ functions
*    to perform a task.]
*
* List of NI-DAQ Functions used in this example:
*    AI_VRead, NIDAQErrorHandler
*
*    [NOTE: For further details on each NI-DAQ function, please refer
*    to the NI-DAQ On-Line Help (NIDAQPC.HLP).]
*
* Pin Connection Information:
*    Connect your analog signal to AI channel 1. The default analog
*    input mode for the DAQ device will be used.
*
*    [For further I/O connection details, please refer to your hardware
*    User Manual.]
*
*    [For further details on how to run this example, please refer to
*    the NI-DAQ Examples On-Line Help (NIDAQEx.HLP).]
*
************************************************************/
/*
* Includes:
*/
#include "nidaqex.h"
/*
* Main:
*/
void main(void)
{
    /*
    * Local Variable Declarations:
    */
    i16 iStatus = 0;
    i16 iRetVal = 0;
    i16 iDevice = 1;
    i16 iChan = 1;
    i16 iGain = 1;
    f64 dVoltage = 0.0;
    i16 iIgnoreWarning = 0;
    iStatus = AI_VRead(iDevice, iChan, iGain, &dVoltage);
    iRetVal = NIDAQErrorHandler(iStatus, "AI_VRead",
        iIgnoreWarning);
    if(iStatus == 0) {
        printf(" The voltage at AI channel %d is %lf volts.\n", iChan,
            dVoltage),
    }
}
/* End of program */
```

As illustrated in the example above, since the source code compiles into a "console" application, there are no complicated calls to set text in a graphical user display, instead a simple, well understood printf call is used.

It is noted that, in the case of Visual Basic, where there is a user interface by default, the Code Generator maps the above print statement to print out to a predefined text box on a Visual Basic form, and behaves very much like the printf statement in C.

The types of "Source" targets that can be generated in the present embodiment are as follows:

Microsoft Visual C++ source code and MAKE file; (for Windows 3.1: ver 1.5; for Win32 OSes: ver 2.0 and above)

Microsoft Visual Basic source code and project file; (for Windows 3.1: ver 3.0; for Win32 OSes: ver 4.0)

Borland C++ source code and batch file (to help build the application) (for version 5.0x)

National Instruments LabWindows/CVI (for version 3.0.1 or later)

Microsoft Word Rich-Text Format (RTF) files that are to be compiled into on-line help documentation As shown in FIG. 4, for the "File listing" target type, preferably only the Filename and Descr fields are extracted and placed into a single file. This filelist file is used as a catalog that lists out brief descriptions of all the examples.

Thus the end-user of the examples is not required to look through each directory and open each example source code to determine what the example does.

For the "Export to Notes DB" (spreadsheet) target, the Filename, the NI-DAQ functions used, the Category, the Keywords, and the target operating system are extracted and placed into a single tab delimited, spreadsheet format file. This spreadsheet file is preferably used by the developer of the examples to match up examples with DAQ devices, and is not intended for use by the end user.

Figure 5:
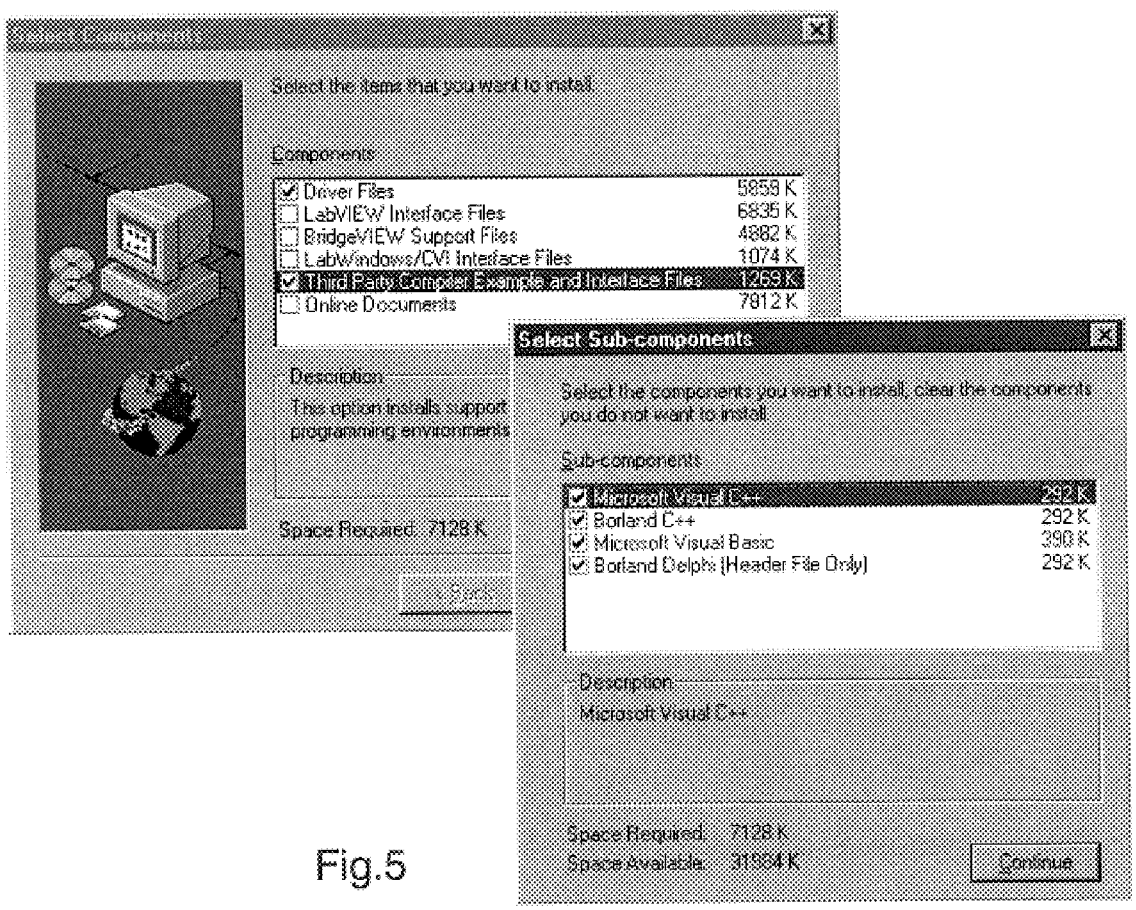
FIG. 5 illustrates operation of the end user selecting target source code example files for installation created using the present invention.

FIG. 5—Packaging of the Examples for Distribution with an Application Program

The products of the Examples Factory Code Generator 204 are preferably copied into a predetermined location network drive location where most application software files are maintained (a.k.a. source tree). The files are then gathered by a separate installer creation process, so that the examples can be distributed as part of the NI-DAQ distribution media (CD-ROM).

When the end-user receives the installation media to install the application program, e.g., NI-DAQ, and selects "Third Party Compiler Support" from the installer option menu, as shown in FIG. 5, these examples, as well as supporting DLLs and files are installed in to the directory of the end-user's choice. (The installer is based on a separate install product.)

Code Flow Definition Language Syntax and Composition Rules

According to the present invention, the developer first generates code flow description files written in a code flow description language. The present invention includes the Code Generator 204, which is operable to generate the different target files based on the code flow description file, written in the code flow description language, and programming language specific rules. To ensure that all code flow description elements can be mapped to features in each programming language, the code flow description language preferably only uses or incorporates a bare minimum of the feature set, e.g., the commonality of the feature set, of supported programming languages, such as:

only one code module per program, and one routine per code module variables declared locally inside the routine and always assigned initial values at the beginning of the routine very simple control flow elements, such as if-elseif-endif, while-end, do-while very little support for simple arithmetic—increment and decrement only (basic arithmetic operations being considered in future version of the Code Flow Description specification)

ability to include any standard function call to other code modules (e.g.: Dynamic Link Libraries), as long as the project files are responsible for resolving externally defined functions some utility features, such as Comment and Print.

Also, to simplify operations for the writer of the code flow description file, the code flow parser preferably includes the following features.

leading white spaces and trailing white spaces are "eaten" (ignored)

a semi-colon (;) at the beginning of a line to embed comments that will not get extracted to the target files, an at-symbol (@) at the end of a line to allow for multiple lines to be considered as one long line (so the code flow description can be formatted nicely into less than 80 characters per line, which is a feature that programmers like)

code flow description files can (theoretically) be up to 2^31 lines in length

The common elements to each code flow description are the following:

a code flow opener, denoted by BeginCodeFlow
a Filename, denoted by Filename:
a Description, denoted by Descr:
a list of keywords that describe the functionality of the example, denoted by TaskIDList:
a category in which the example belongs, denoted by Category:
signal connection information to assist the end user of the example in figuring out how to connect physical signals to the data acquisition device to make the program work, denoted by PinConnInfo:
a code block opener, denoted by an open curly bracket ({)
variable declarations, denoted by Var:
function calls and control flow elements, which are denoted by Func: and have their own opener and closer curly brackets)
a code block closer, denoted by a close curly bracket (})
a code flow closer, denoted by EndCodeFlow The variable declaration syntax is as follows:

Var: <Type>, <Name>, <InitialValue>, <KeyParamT/F>, [ArraySize]

The <Type> field specifies the type of variable (i8, u8, i16, u16, i32, u32, STRING).

The <Name> field specifies the name of the variable.

The <InitialValue> field specifies the initial value of the variable.

The <KeyParamT/F> field specifies whether this variable is a "key parameter" in this program or not. That is, if the value of this variable is changed, then the behavior of the program would change drastically. A "True" or "False" is specified.

The optional field <ArraySize> indicates whether the variable name denoted by <Name> is an array or not. In the case where the variable is an array, the <InitialValue> field can be a common initial value for all array elements, or the individual initial values can be specified by a |-delimited list of values. (e.g.: 1|2|3|4).

The function declaration syntax for ordinary functions is as such:

```
Func: <funcName>,<retVarName>
{
   Param: <paramName>[,*]
   ...
}
```

The <funcName> field specifies the function name. If <funcName> is Comment, INCR, or DECR, only the first Param: is accepted and the rest will be rejected.

The <retVarName> field specifies the variable to which the function will assign its return value.

The Param: indicates that the following is a parameter, and is to be listed in order. The <paramName> field specifies a variable name or a constant to be passed into the function. The Param: can also have an optional asterisk (*), which indicates to the parser that this parameter is to be passed by address in C languages. (Ignored for Visual Basic, since every parameter is passed by address to begin with.)

For control-flow functions, the syntax is as such:

```
Func: <controlFlowFunc>
{
    Cond: <CondVar>,<CompareType>,<CompValue>,<Conj>
    ...
}
```

The <controlFlowFunc> field indicates the name of the control flow function, which could be if, elseif, endif, while, wend, do, or dowhile. Once a control flow function is specified, the Code Generator's internal state machine goes into a new state so that the balancing of such control flow blocks are ensured at parsing time. Also, if the <controlFlowFunc> is an endif, wend, or do, no Cond: statements are necessary.

The Cond: keyword indicates the following is a condition for if, elseif, while, and dowhile. The <CondVar> field indicates a variable name to check.

The <compareType> field can contain GT (greater than), GE (greater than or equal to), LT (less than), LE (less than or equal to), EQ (equal to), or NE (not equal).

The <compvalue> field contains either another variable or a constant to compare.

The <conj> field indicates whether the next condition statement is to be ANDed or ORed, or if this current condition is the LAST, in which case the next line is a close-curly bracket.

Below is a code flow description file that contains most of the elements of the code flow description language.

```
;<-- this is a comment
BeginCodeFlow
    Filename:   DAQop
    Descr:      This is a test example that tests the @
                code generator . . .
    TaskIDList: BUF,1CH,BURST,IMMED,INTTRG
    Category:   AI
    PinConnInfo: Connect analog signal to AICH1 @
                default mode for device will be used.
; begin code <-- this is a comment
    {
;STANDARD SYNTAX for local variable declarations . . .
; Var: iType, strName, strInitValue, flagKeyParam, [iArraySize]
;                   -if array, give first elem value.
;                    if empty, scalar
    Var: I16, iStatus, 0, False
    Var: i16, iDevice, 1, False
    Var: i32, lTimeout, 200*18, True
    Var: I16, iChan, 0, False
    Var: I16, iGain, 1, False
    Var: F64, dSampRate, 1000.0, True
    Var: I32, 1Count, 1000, False
    Var: i16, piBuffer, 0, false, 1000
    Func: Comment
    {
    ; the "@" at the end of a line is a line-continuation character
        Param: This is a comment, blah blah blah . . . @
            second line of comment . . . and no more!
    }
; STANDARD SYNTAX for function declarations . . .
; Func: strName, strRetVar
; {
;       Param: strName, * (optional: pass by address)
;           for all params
;       }
    Func: Timeout_Config, iStatus
    {
        Param: iDevice
        Param: 1Timeout
    }
```

```
    Func: DAQ_Op, iStatus
    {
        Param: iDevice
        Param: iChan
        Param: iGain
        Param: piBuffer
        Param: 1Count
        Param: dSampRate
    }
; must keep a list of functions other than IF, WHILE, DO, DOWEND
; for the following, treat "Cond" like "Param"
Func: IF
; open new block . . . keep open until next "elseif" or "endif"
    {
;       Cond: strCondVar, iCompareType, strCompValue, iConj
        Cond: strCondVar1, GE, strCompValue1, AND
        Cond: strCondVar2, GT, strCompValue2, OR
        ; don't use NAND, NOR - not supported!!!
        ;Cond: strCondVar3, LE, strCompValue3, NAND
        ;Cond: strCondVar4, LT, strCompValue4, NOR
        Cond: strCondVar5, EQ, strCompValue5, XOR
        Cond: strCondVar6, NE, strCompValue6, LAST
        ; iConj = LAST if last condition
    }
Func: ELSEIF
; close previous block
; open new block . . . keep open until next "elseif" or "endif"
    {
;       Cond: strCondVar, iCompareType, strCompValue, iConj
        Cond: elseifVar12, NE, elseifValue12, LAST
        ; iConj = LAST if last condition
    }
Func: ELSE
Func: ENDIF
; close block
Func: WHILE
; open new block . . . keep open until next "wend"
    {
;       Cond: strCondVar, iCompareType, strCompValue, iConj
        Cond: whileVar22, EQ, whileValue22, LAST
        iConj = LAST if last condition
    }
Func: WEND
; close block
Func: DO
; open new block . . . keep open until next "dowend"
; increment by one
Func: INCR
    {
        Param: 1Count
    }
; print statement
Func: PRINT
    {
        Param: The current value of 1Count is, CONST
        Param: 1Count, I32
    }
; decrement by one
Func: DECR
    {
        Param: 1Count
    }
Func: PRINT
    {
        Param: Now the value of 1Count is, CONST
        Param: 1Count, I32
    }
Func: PRINT
    {
        Param: The data of piBuffer at 1Count is, CONST
        Param: piBuffer[1Count], I16
    }
Func:DOWEND
; close block then check condition
    {
;       Cond: strCondVar, iCompareType, strCompValue, iConj
        Cond: dowendVar32, GT, doWendValue32, LAST
        ; iConj = LAST if last condition
    }
```

-continued

```
    Func: Comment
    {
        Param: end of program
    }
}
EndCodeFlow
```

For all functions (Func:) that are not part of the code flow specification, the project files or MAKE files (that also get generated at the same time the source code files are) must resolve the externally declared functions. Most such functions are in a DLL for Windows, which can be resolved by linking in an import library.

Figure 6:
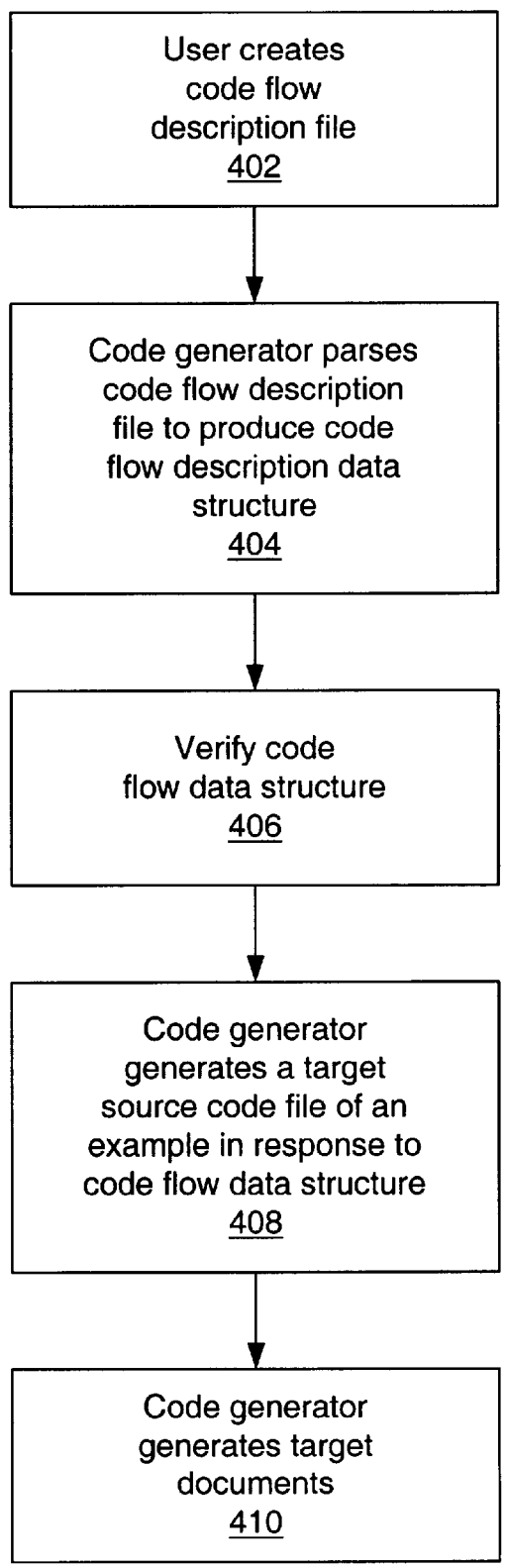
FIG. 6 is a flowchart diagram illustrating operation of the present invention.

FIG. 6—Flowchart of Operation of the Present Invention

FIG. 6 is a flowchart diagram which illustrates the use and operation of the present invention. As shown, in step 402 the user creates a code flow description file written in the code flow description language. In the preferred embodiment, the user utilizes the program flow editor 212 in creating the code flow description file. The syntax of the code flow description file was discussed above.

In step 404 the Code Generator 204 parses the code flow description file to produce a code flow description data structure, also referred to as a code flow record. The operation of this parsing step is discussed further below. Example source code for a code flow description data structure is included as Appendix 1.

In step 406 the Code Generator 204 verifies the code flow data structure, i.e., verifies that the code flow data structure created includes the requisite components. Thus, once the code flow description file has been parsed into the code flow record data structure, the Code Generator 204 determines if certain fields have been filled out. The code flow record data structure fields include file name, description, task ID list, category, pin connection information, at least one variable, and one function. The Code Generator 204 verifies that these fields include data. Also, for the task ID list and category, the Code Generator 204 ensures that these contain the valid key words.

In step 408 the Code Generator 204 generates one or more target source code example files in response to the code flow record data structure. In step 408 the Code Generator 204 utilizes the particular syntax rules which are particular to the respective target programming language in order to generate target source code with the correct syntax for that respective programming language. The source code of a function which maps a CodeFlowRecord data structure into a C source code file is included as Appendix 2.

Thus, once the code flow record data structure has been verified, then the Code Generator 204 generates the target source code example file(s) for each target programming language and/or operating system. The Code Generator 204 essentially operates to map the contents of the code flow record data structure into the appropriate programming language styles of the target programming languages.

In general, each programming language includes certain semantic rules in terms of creating a program. For instance, in Visual Basic, each variable has a data type indicator, either a percent sign for an integer or & for a long integer, and these are appended to the variable names as the program is constructed. In a similar manner, for each target programming language, the Code Generator 204 uses the syntax rules of the respective programming language in creating the target source code example file.

The Code Generator also follows certain rules for generating comments. For example, in Visual Basic a comment is always preceded by an apostrophe, whereas the C language utilizes a /* to begin a comment and an */ to end a comment. These types of semantic rules are enforced while the code flow record data structure is being mapped to a target source code file.

Also, while generating the source code file, the Code Generator 204 preferably creates a project file at the same time. A project file comprise a list of source code files which form the respective program. In the case of the C language, this occurs as a Make file, i.e., a regular Visual C++ Make file that is created with various inferenced rules for compiling a program and linking the executable. In the case of Visual Basic, the Visual Basic project file is created to include information such as the source files being included, etc.

In step 410 the Code Generator 204 generates any target documentation desired by the user utilizing the code flow record data structure. In the preferred embodiment, the Code Generator 204 generates the target documentation by concatenating the comments provided in the code flow description file into a textual documentation file.

The Code Generator has the following operational hierarchy (in psuedocode).

FUNCTION Go parse the whole Code Flow Description File

```
(given CodeFlowFileName, TargetLang, TargetOS, TargetDir)
BEGIN
    Open the Code Flow file identified by "CodeFlowFileName";
    Count the number of records in file;
    while there are more records and no errors exist
    {
        Get the next code flow record and store in a CodeFlowRecord data
structure (step 404);
        Verify the code flow record data structure (step 406);
        Generate the source using the CodeFlowRecord data structure
        (step 408);
    (given language, OS, target dir.)
        Decide what to do next; (end of file, report error, continue)
    }
END
```

The "Open the Code Flow file identified by CodeFlow-FileName" simply opens the file and returns a file handle.

The "Count the number of records in file" performs pre-processing to ensure that all "BeginCodeFlow" keywords have a matching "EndCodeFlow" keyword, and also counts the number of such pairs. (Each pair corresponds to a single code flow=an example program).

The "Get the next code flow record . . . " is explained below.

The "Verify the code flow record data structure" performs a check to determine if the code flow record contains the required elements.

The "Generate the source using the CodeFlowRecord data structure" generates the target files from the CodeFlow-Record data structure, given the language, OS, and target directory. Fundamentally, this function calls language-specific functions to perform the actual work of mapping the CodeFlowRecord to different target formats. In other words, this function maps the CodeFlowRecord data structure to a source code file of the desired programming language.

The "Decide what to do next" determines if there are any more records, or if there was an error while generating the source. If any abnormalities happened, this will make the while-loop terminate with some error code. If there are no more records left, the while-loop terminates with an "End-OfFile" status code. Otherwise, the execution remains in the while-loop.

The "Get the next code flow record and store in a CodeFlowRecord structure" function is discussed below.
FUNCTION Get the next code flow record and store in a CodeFlowRecord structure

```
BEGIN
    while there are more lines for the code flow record and no errors exist
    {
        Get the next non-comment and non-blank line in code flow file;
        CodeFlowStateMachine; (parse line of text and store into
CodeFlowRecord)
    }
END
```

The "Get the next non-comment and non-blank line in code flow file" rejects any line that begins with a comment symbol (;) and also concatenates lines that end with the line-continuation symbol (@) with the next one.

Figure 7:
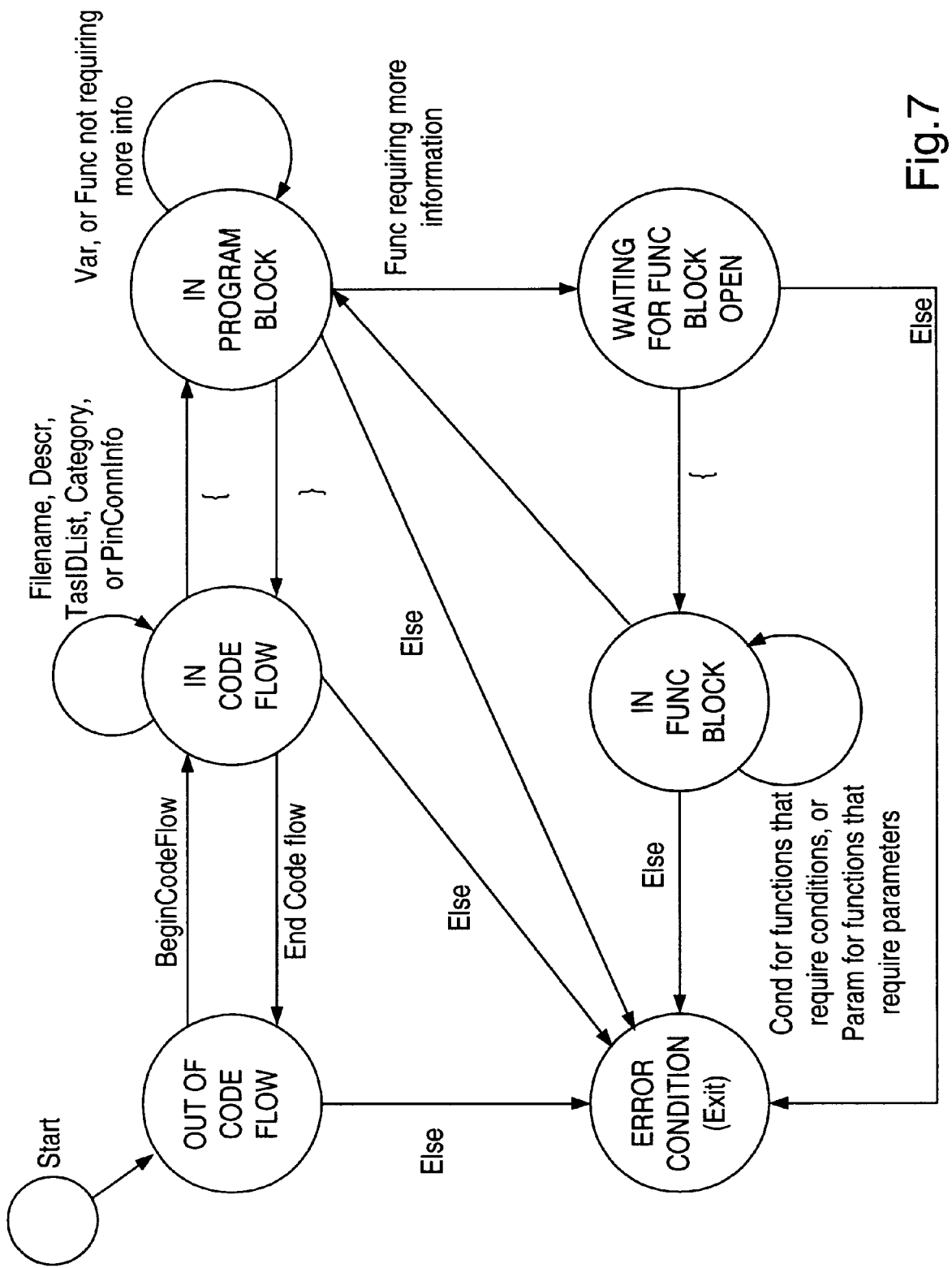
FIG. 7 is a state machine illustrating operation of the parsing method utilized by the code generator.

FIG. 7 is a state diagram of the CodeFlowStateMachine. As shown in FIG. 7, the CodeFlowStateMachine is a state machine with 5 states. The BeginCodeFlow/EndCodeFlow transition marks the end of a single code flow record and allows the while loop to terminate. The central part of the Code Generator Parser State Machine reads the code flow description file into a data structure. The operation of the state machine can be readily understood with reference to the example code flow description file included above.

As shown, the state machine begins in an "Out of Code Flow" state. The state machine advances from the Out of Code Flow state to the "In Code Flow" state when a BeginCodeFlow command is detected in the code flow description file. If an "Else" statement is encountered in the Out of Code Flow state, the state machine advances to the "Error Condition (Exit)" state.

In the In Code Flow state, the Code Generator 204 extracts the Filename, Descr, TaskIDList, Category, and/or PinConnlnfo information into the data structure. If an End-CodeFlow command is detected, then operation returns to the Out of Code Flow state.

After the information is extracted in the In Code Flow state, when an open curly bracket "{" is detected, the state machine advances to the "In Program Block" state. If an EndCodeFlow command is detected in the code flow description file in the In Code Flow state, the state machine returns to the Out of Code Flow state.

In the In Program Block state, Variable (Var) and/or Function (Func) information, which does not require more information, is extracted into the data structure. If a Func requiring more information is encountered in the In Program Block state, the state machine advances to the "Waiting for Func Block Open" state. If an "Else" statement is encountered in the "In Program Block" state, the state machine advances to the "Error Condition (Exit)" state. If a close curly bracket "}" is encountered in the In Program Block state, the state machine returns to the In Code Flow state.

In the Waiting for Func Block Open state, if an open curly bracket "{" is detected, the state machine advances to the "in Func Block" state. If an "Else" statement is encountered in the Waiting for Func Block Open state, the state machine advances to the Error Condition (Exit) state.

In the In Func Block state, the Code Generator 204 extracts information inside the function block into the data structure, such as "Cond" commands for functions that require conditions and "Param" commands for functions that require parameters. If a close curly bracket "}" is encountered in the In Func Block state, the state machine returns to the In Program Block state. If an "Else" command is encountered in the "In Func Block" state, the state machine advances to the Error Condition (Exit) state.

After the parsing state machine executes to convert the code flow segments in the code flow description file into respective data structure(s), the data structure(s) are then extrapolated into the different target files with language specific rules, coding styles, and project files. Since the language syntax is part of the programming language itself, details regarding the exact syntax of each function call has been omitted for simplicity.

Generating the Example Programs from the Code Flow Data Structure

After the code flow description file has been parsed and the code flow record data structure has been created or filled, the Code Generator 204 performs the work of mapping each individual CodeFlowRecord data structure into the target files. As noted above, this operation comprises generating source code for a particular target programming language using the syntax rules of the particular target programming language. The source code of a function which maps a CodeFlowRecord data structure into a C source code file is included as Appendix 2.

As discussed above, in the current embodiment the target files are as follows:
Microsoft Visual C++
Borland C++
National Instruments LabWindows/CVI
Microsoft Visual Basic
On-line help RTF files
Filelist file
Spreadsheet (for internal use)
The C Languages The C source code target files for the C-programming environments (VC++, BC++, CVI) are the same, since all environments accomodate a GUI-less program (commonly known as console applications). The variables definitions and function declarations are all placed inside the void main(void) routine. This was discussed above.

The project files for Visual C++ are makefiles, which provide the inference rules for compiling the source code and linking with the NI-DAQ import libraries. These make files use slightly different flags between 16-bit and 32-bit Windows.

The project files for LabWindows/CVI are PRJ files, which specify other file dependencies, and conform to the LW/CVI version 3.0.1 standards (also compatible with later versions).

The project files for Borland C++ are actually batch (.BAT) files, which help the end-user compile the source code and link the NI-DAQ import libraries for Borland C++. These batch files also provide some help on how to construct an Borland C++ .IDE file from its integrated development environment.

Visual Basic

For Visual Basic, to accommodate the PRINT statement as defined in the code flow description file, the generated Visual Basic form has a method called PrintText:

```
'
'**************************************************************
' SUBROUTINE: PrintText
' DESCRIPTION: PrintText to desired TextBox (upto 4096 characters)
' INPUTS: txtBox - TextBox to print on
'     strText - Text to print
'
```

-continued

```
**************************************************************
Sub PrintText(txtBox as TextBox, strText as string)
    txtBox.Text = Right$(txtBox.Text + strText$ + Chr$(13) + Chr$(10),
LEN_PRINTTEXT)
    txtBox.SelStart = Len(CStr(txtBox.Text))
    DoEvents
End Sub
```

This function behaves like a printf statement in C on a command-based environment. The variables definitions and function declarations are all placed inside a command button method function called cmdDoOperation_Click() routine, as shown here:

```
'
'**************************************************************
' SUBROUTINE: cmdDoOperation_Click
' DESCRIPTION: The main NI-DAQ operations are here
'
'**************************************************************
Sub cmdDoOperation_Click( )
'
    ' Local Variable Declarations:
    Dim iStatus As Integer
    Dim iRetVal As Integer
    Dim iDevice As Integer
    Dim iChan As Integer
    Dim iGain As Integer
    Dim dVoltage As Double
    Dim iIgnore Warning As Integer
    iDevice% = 1
    iChan% = 1
    iGain% = 1
    dVoltage# = 0.0
    ' Temporarily disable buttons for protection from 'DoEvents'
    cmdDoOperation.Enabled = False
    cmdExit.Enabled = False
    iStatus% = AI_VRead(iDevice%, iChan%, iGain%, dVoltage#)
    . . .
```

The Visual Basic project files (.MAK for VB 3.0, .VBP for VB 4.0) simply contain a list of files that are part of the project.

On-line Help RTF files

Figure 8:
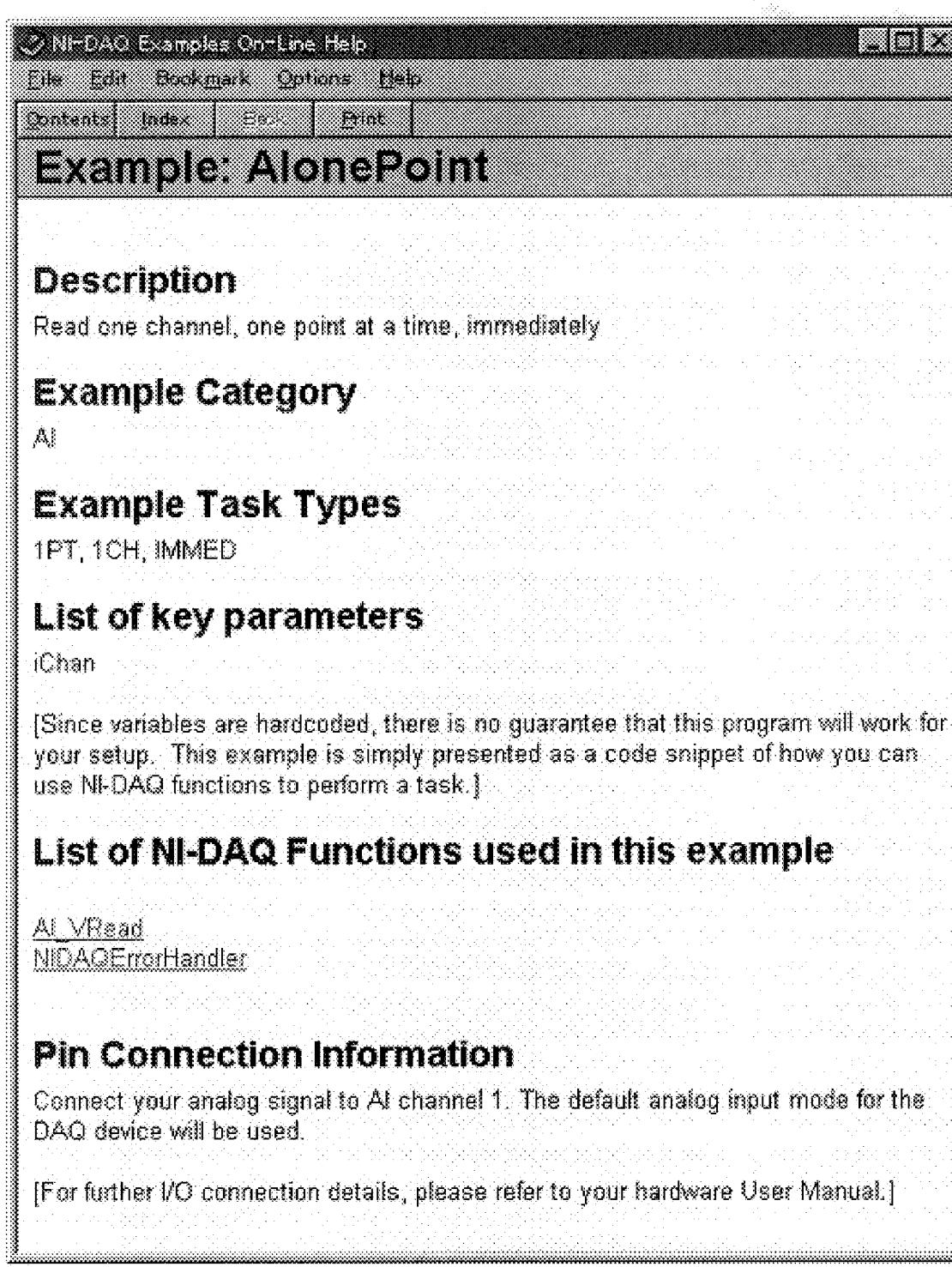
FIG. 8 illustrates an online help file created using the present invention.

As noted above, the present invention is useable for creating on-line help or documentation files. The RTF files for on-line help are preferably created using OLE Automation technology. In the Code Generator program, a Word-.Basic object is instantiated, and formatting commands are invoked to specify the text that goes into the help file. Each code flow record is transformed to a single RTF file, which is then compiled into a Windows On-Line Help file using the Microsoft Help Workshop. FIG. 8 is a sample screen shot from the compiled help file. The text of this help file is consistent with the earlier AlonePoint.c source code example.

Supporting Files

In the preferred embodiment where the application program is NI-DAQ, several files are hand-created to supplement the generated example files. These hand-created files are as follows:

NIDAQEX.H—common header file for all C programming languages, containing function declarations and constant definitions NIDAQEX.C—only for LabWindows/CVI, providing support for NI-DAQ Examples Utility functions (e.g. NIDAQErrorHandler)

NIDEX16.BAS and NIDEX32.BAS—only for Visual Basic, containing function declarations and constant definitions NIDEX16.DLL/NIDEX16(B).LIB and NIDEX32.DLL/NIDEX32(B).LIB —a dynamic link library for the Nl-DAQ Examples Utility functions (used with VC++, BC++, and VB)

The project files link the above files in selectively for the target programming language.

Additional Features

In one embodiment, the code flow descriptor file itself can hold comments in multiple human languages. This allows the use of a single Code Flow Descriptor file which creates example programs with just the comments and the header descriptions translated to other languages (Japanese, French, German).

In the current embodiment, the code flow specification only supports one subroutine per code flow segment. In an alternate embodiment, the code flow description language supports examples with multiple subroutines or functions, such as examples that require other subroutines or functions that must be part of the example, for instance, callback functions.

In one embodiment, the Code Generator 204 includes a feature where the user of the Code Generator can specify a header template, and the code flow definitions file contains fields that match the given header template.

In one embodiment, calls to application program functions, e.g., NI-DAQ functions, are entered manually. Therefore, there is no guarantee that the products of the Code Generator 204 will compile and link properly until the source code is actually compiled and linked. In the preferred embodiment, the function prototype is provided from a separate function database, such as a Lotus Notes database, and cross-verified for syntax correctness.

In one embodiment, the Code Generator 204 includes a Command Line interface. As shown in the screen shot of FIG. 4, the Code Generator 204 itself has a GUI. In this embodiment, the Code Generator 202 can also be invoked with specific options from the Windows command prompt. Thus the example creation process can be made part of the daily automated builds of the application program.

APPENDIX 1

Appendix 1 comprises example source code of a code flow record data structure created according to the present invention. The primary data structure is located at the end and is titled "tCodeFlowRecord". This data structure contains the string fields for things such as filename, description, etc. and also arrays of other sub fields. The subfields are also data structures, and they are defined further up in the file.

APPENDIX 2

Appendix 2 comprises source code of a function called "GenerateSourceC", which operates to generate C source code from a code flow record data structure.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

Appendix 1

CodeFlowRecord Data Structure Source Code

Title: System and Method for Automatically Creating Source Code Example Files for an Application Program in a Plurality of Programming Languages

Inventors: Ken Sadahiro

```
' Copyright National Instruments

' user defined types - for CodeGen.BAS and other sub modules
'
'- - - - - - - - - - - - - - - - - - - - - - - - - - - - - -
' TYPEDEF:  tVarRecord
' DESCR:    a structure to store variable information
' AUTHOR:   Ken Sadahiro
'- - - - - - - - - - - - - - - - - - - - - - - - - - - - - -
Global Const MAX_VARS = 64      ' max (32) variables per function
' Field Positions of variable information
Const CGFIELDPOS_VARTYPE = 1        ' Parsing offset: var type
Const CGFIELDPOS_VARNAME = 2        ' Parsing offset: var name
Const CGFIELDPOS_VARINITVAL = 3     ' Parsing offset: var initial value
Const CGFIELDPOS_VARKEYPARAM = 4    ' Parsing offset: var keyparam flag
Const CGFIELDPOS_VARARRAYSIZE = 5   ' Parsing offset: var array size Type tVarRecord
    iType As Integer        ' type of variable: see COMMON.BAS (TYPE_xxx)
    strName As String       ' name of variable
    strInitValue As String  ' initial value of variable: look at iType
    flagKeyParam As Integer ' is it a key param? TRUE/FALSE
    lArraySize As Long      ' # of elements, if array
    ' DECISION METHOD...
    ' if iArraySize = 1 and flagPointer = True, PASS BY REFERENCE
    ' if iArraySize > 1 and flagPointer = True, preDECLARE array
    ' if flagPointer = False, regular variable
End Type '- - - - - - - - - - - - - - - - - - - - - - - - - - - - - -
' TYPEDEF:  tIfWhileCondition
' DESCR:    a structure to store info about if/while statements
' AUTHOR:   Ken Sadahiro
'- - - - - - - - - - - - - - - - - - - - - - - - - - - - - -
Global Const MAX_CONDITIONS = 8     ' max 8 if/while conditions per function
Const CGFIELDPOS_CONDVAR = 1        ' Parsing offset: condition variable
Const CGFIELDPOS_CONDCOMPTYPE = 2   ' Parsing offset: condition compare type
Const CGFIELDPOS_CONDCOMPVAL = 3    ' Parsing offset: condition compare value
Const CGFIELDPOS_CONDCONJ = 4       ' Parsing offset: condition conjunction
Type tIfWhileCondition
    strCondVar As String        ' name of variable to compare
    iCompareType As Integer     ' GT, GE, LT, LE, EQ, NE
    strCompareValue As String   ' the value to compare
    iConjunction As Integer     ' AND, OR, ..., or LAST: see common.bas
End Type
```

```
'------------------------------
' TYPEDEF: tParamRecord
' DESCR:   a structure to store function parameter info
' AUTHOR:  Ken Sadahiro
'------------------------------
Global Const MAX_PARAMS = 16
Const CGFIELDPOS_PARAMNAME = 1    ' Parsing offset: parameter name
Const CGFIELDPOS_PARAMBYADDR = 2  ' Parsing offset: parameter by address flag
Const CGFIELDPOS_PARAMTYPE = 2    ' Parsing offset: SAME OFFSET as flag! (for
PRINT)
Type tParamRecord
    strName As String        ' name of parameter
    flagByAddr As Boolean    ' pass by address? TRUE/FALSE
    iParamType As Integer    ' PRIMARILY USED FOR "PRINT"
End Type '------------------------------
' TYPEDEF: tFuncRecord
' DESCR:   a structure to store function related information
' AUTHOR:  Ken Sadahiro
'------------------------------
Global Const MAX_FUNCS = 64    ' max (48) functions per function (***THIS MAY
HAVE TO INCREASE!!!)
' Field Positions of function information
Const CGFIELDPOS_FUNCNAME = 1
Const CGFIELDPOS_FUNCRETURNASSIGN = 2

Type tFuncRecord
    strFuncname As String        ' NI-DAQ func, toolFunc, or
                                 ' if/elseif/else/while/print/comment
                                 ' if "comment", just add comment
                                 ' see COMMON.BAS strComment As String         ' comment (instead of function)
                                 ' if comment is non-Empty, then just print comment
    strReturnAssign As String iNumParams As Integer
    listParam(MAX_PARAMS) As tParamRecord ' the following are used only if if/while conditions are used
    iNumIfWhileConditions As Integer    ' number of if/while conditions
    listIfWhileCondition(MAX_CONDITIONS) As tIfWhileCondition
```

```
' this is not really used, since there is a separate block
' end function (WEND, ENDIF, DOWEND, etc.)
flagCloseIfWhileAfterThis As Integer    ' close block after this line? TRUE/FALSE End Type '-------------------------------
' TYPEDEF: tCodeFlowRecord
' DESCR:   a structure to store codeFlow related information
'          The elements in this record are all that's necessary
'          to describe a simple NI-DAQ example program!!!
' AUTHOR:  Ken Sadahiro
'-------------------------------
Type tCodeFlowRecord strFilename As String              ' filename
    strDescr As String                 ' looooong string...
    strTaskIDList As String            ' string with delimiters: see commom.bas
    strCategory As String              ' unique! (AI, AO, DI, DO, CTR, SCXI, EVENT)
    strPinConnInfo As String           ' looooong string...

iNumVars As Integer                ' number of variables
    listVars(MAX_VARS) As tVarRecord   ' variable list iNumFuncs As Integer               ' number of functions
    listFuncs(MAX_FUNCS) As tFuncRecord    ' function list (includes comments)

End Type
```

Appendix 2

GenerateSourceC

Title: System and Method for Automatically Creating Source Code Example Files for an Application Program in a Plurality of Programming Languages

Inventors: Ken Sadahiro

Copyright National Instruments

```
Public Function GenerateSourceC(hdlFile As Integer, codeFlowRecord As tCodeFlowRecord)

Dim iIndentLevel As Integer
    Dim iNewIndentLevel As Integer
    Dim iStatus As Integer
    Dim strTemp As String
    Dim iNumVars As Integer
    Dim iNumFuncs As Integer
    Dim iNumParams As Integer
    Dim iIndex As Integer
    Dim iSubIndex As Integer ' ================================================================================
' HEADER SECTION iStatus% = PutNextLine(hdlFile%, CGC_Comment_Open + CGC_Separator)
    iStatus% = PutNextLine(hdlFile%, CGC_BlockComment_PrePose)

iIndentLevel% = 1
    '
    ' title
    '
    iStatus% = PutNextLine(hdlFile%, CGC_BlockComment_PrePose + " Example program: ")
    iStatus% = PutNextLine(hdlFile%, CGC_BlockComment_PrePose + TabLevel(iIndentLevel%) + _
                    ExtractFilename$(codeFlowRecord) + ".c")
    iStatus% = PutNextLine(hdlFile%, CGC_BlockComment_PrePose)

'
    ' description
    '
    iStatus% = PutNextLine(hdlFile%, CGC_BlockComment_PrePose + " Description: ")
    Call SplitIndentAndWriteLongLine(hdlFile%, iIndentLevel%, True, ExtractDescr$(codeFlowRecord))
    iStatus% = PutNextLine(hdlFile%, CGC_BlockComment_PrePose)

'
    ' category
    '
    iStatus% = PutNextLine(hdlFile%, CGC_BlockComment_PrePose + " Example Category: ")
    Call SplitIndentAndWriteLongLine(hdlFile%, iIndentLevel%, True, ExtractCategory$(codeFlowRecord))
    iStatus% = PutNextLine(hdlFile%, CGC_BlockComment_PrePose)

'
    ' taskIDs
    '
    iStatus% = PutNextLine(hdlFile%, CGC_BlockComment_PrePose + " Example Task Types: ")
    Call SplitIndentAndWriteLongLine(hdlFile%, iIndentLevel%, True, ExtractTaskIDList$(codeFlowRecord))
    iStatus% = PutNextLine(hdlFile%, CGC_BlockComment_PrePose)
```

```
'
' key parameter info
'
iStatus% = PutNextLine(hdlFile%, CGC_BlockComment_PrePose + " List of key parameters: ")
Call SplitIndentAndWriteLongLine(hdlFile%, iIndentLevel%, True, _
ExtractKeyParamList$(codeFlowRecord))
iStatus% = PutNextLine(hdlFile%, CGC_BlockComment_PrePose)
'
' get variable hardcoding disclaimer
'
Call SplitIndentAndWriteLongLine(hdlFile%, iIndentLevel%, True, _
               GetDisclaimer(DISCLAIMER_TYPE_EXAMPLE, HUMANLANG_ENG))
iStatus% = PutNextLine(hdlFile%, CGC_BlockComment_PrePose)

'
' ni-daq example list
'
iStatus% = PutNextLine(hdlFile%, CGC_BlockComment_PrePose + _
               " List of NI-DAQ Functions used in this example: ")
Call SplitIndentAndWriteLongLine(hdlFile%, iIndentLevel%, True, _
               ExtractNIDAQFuncList$(codeFlowRecord))
iStatus% = PutNextLine(hdlFile%, CGC_BlockComment_PrePose)
'
' get func list disclaimer
'
Call SplitIndentAndWriteLongLine(hdlFile%, iIndentLevel%, True, _
               GetDisclaimer(DISCLAIMER_TYPE_APIDETAILS, HUMANLANG_ENG))
iStatus% = PutNextLine(hdlFile%, CGC_BlockComment_PrePose)
'

'
' pin connection information
'
iStatus% = PutNextLine(hdlFile%, CGC_BlockComment_PrePose + _
               " Pin Connection Information: ")
Call SplitIndentAndWriteLongLine(hdlFile%, iIndentLevel%, True, _
               ExtractPinConnInfo$(codeFlowRecord))
iStatus% = PutNextLine(hdlFile%, CGC_BlockComment_PrePose)
'
' get i/o connector disclaimer
'
Call SplitIndentAndWriteLongLine(hdlFile%, iIndentLevel%, True, _
               GetDisclaimer(DISCLAIMER_TYPE_IOCONNECT, HUMANLANG_ENG))
iStatus% = PutNextLine(hdlFile%, CGC_BlockComment_PrePose)

'
' get how-to-run disclaimer
'
Call SplitIndentAndWriteLongLine(hdlFile%, iIndentLevel%, True, _
               GetDisclaimer(DISCLAIMER_TYPE_HOWTORUN, HUMANLANG_ENG))
iStatus% = PutNextLine(hdlFile%, CGC_BlockComment_PrePose)
```

```
    iStatus% = PutNextLine(hdlFile%, CGC_Separator + CGC_Comment_Close)

'==============================================================================
' INCLUDE SECTION
'
  ' include files
  '
  iStatus% = PutNextLine(hdlFile%, CGC_Comment_Open)
  iStatus% = PutNextLine(hdlFile%, " " + CGC_BlockComment_PrePose + " Includes: ")
  iStatus% = PutNextLine(hdlFile%, " " + CGC_Comment_Close)
  iStatus% = PutNextLine(hdlFile%, "")
  iStatus% = PutNextLine(hdlFile%, "#include ""nidaqex.h""")
  iStatus% = PutNextLine(hdlFile%, "")
  iStatus% = PutNextLine(hdlFile%, "")

'==============================================================================
' PROGRAM SECTION iStatus% = PutNextLine(hdlFile%, CGC_Comment_Open)
  iStatus% = PutNextLine(hdlFile%, " " + CGC_BlockComment_PrePose + " Main: ")
  iStatus% = PutNextLine(hdlFile%, " " + CGC_Comment_Close)
  iStatus% = PutNextLine(hdlFile%, "")
  iStatus% = PutNextLine(hdlFile%, CGC_Main)
  iStatus% = PutNextLine(hdlFile%, CGC_Block_Open)

'
  ' declare variables
  '
  iNumVars% = ExtractNumVars(codeFlowRecord)
  If (iNumVars% > 0) Then iStatus% = PutNextLine(hdlFile%, TabLevel(iIndentLevel%) + CGC_Comment_Open)
     iStatus% = PutNextLine(hdlFile%, TabLevel(iIndentLevel%) + " " + _
                            CGC_BlockComment_PrePose + " Local Variable Declarations: ")
     iStatus% = PutNextLine(hdlFile%, TabLevel(iIndentLevel%) + " " + CGC_Comment_Close)
     iStatus% = PutNextLine(hdlFile%, "")

For iIndex% = 0 To iNumVars% - 1 strTemp$ = FormatVarIntoDeclaration(codeFlowRecord.listVars(iIndex%))
        iStatus% = PutNextLine(hdlFile%, TabLevel(iIndentLevel%) + strTemp$)

Next iIndex% iStatus% = PutNextLine(hdlFile%, "")

End If

'
  ' place functions
  '
  iNumFuncs% = ExtractNumFuncs(codeFlowRecord)
```

```
iIndentLevel% = 1
iNewIndentLevel% = 1
If (iNumFuncs% > 0) Then

For iIndex% = 0 To iNumFuncs% - 1 strTemp$ = FormatFuncIntoCode(iIndentLevel%, codeFlowRecord.listFuncs(iIndex%),
iNewIndentLevel%)
        If (Not IsFuncPrint(ExtractFuncName(codeFlowRecord.listFuncs(iIndex%)))) Then ' not a print function, so do the split line thing!!!
            ' since FormatFuncIntoCode handles the indenting, pass call function that keeps indent line
            Call SplitAndWriteLongLine(hdlFile%, iIndentLevel%, False, strTemp$)

Else
            ' print function, don't bend it - let it run on...
            iStatus% = PutNextLine(hdlFile%, strTemp$)

End If

If (iNewIndentLevel% <> iIndentLevel%) Then
            iIndentLevel% = iNewIndentLevel%
        End If iStatus% = PutNextLine(hdlFile%, "")

Next iIndex% iStatus% = PutNextLine(hdlFile%, "")

End If iStatus% = PutNextLine(hdlFile%, CGC_Block_Close)
iStatus% = PutNextLine(hdlFile%, "")

iStatus% = PutNextLine(hdlFile%, CGC_Comment_Open + " End of program " +
CGC_Comment_Close)

End Function
```

I claim:

1. A computer system configured to generate one or more source code files, the computer system comprising:

a CPU;

a system memory coupled to the CPU, wherein the system memory comprises:

a code flow description file, wherein the code flow description file is written in a code flow description language, wherein the code flow description language includes common programming elements from said plurality of programming languages;

a code generator which is operable to receive user input indicating one or more target programming languages, wherein the code generator is operable to examine the code flow description file and generate one or more source code files in said one or more target programming languages; and a function database stored in the memory of the computer system which stores functions of said application program written in said code flow description language;

wherein said function database is useable in creating said code flow description file;

wherein the code generator is operable to parse the code flow description file to produce a code flow description data structure; and wherein the code generator is operable to generate said one or more source code files in said one or more target programming languages in response to said code flow description data structure.

2. The computer system of claim 1, wherein the code flow description file includes a plurality of code flow segments, wherein the code generator is operable to parse each of said code flow segments and produce a code flow description data structure for each of said code flow segments;

wherein the code generator is operable to generate said one or more source code files in said one or more target programming languages in response to said code flow description data structures corresponding to each of said code flow segments.

3. The computer system of claim 1, wherein, for each of said one or more target programming languages, the code generator is operable to generate said one or more source code files using syntax rules of said target programming language.

4. The computer system of claim 1, wherein said plurality of target programming languages include one or more from the group comprising: C, Visual Basic, and LabWindows/CVI.

5. The computer system of claim 1, further comprising:

a program flow editor stored in the memory of the computer system which is operable for creating said code flow description file utilizing said code flow description language.

6. The computer system of claim 1, wherein said code flow description language includes a syntax for specifying comments;

wherein said code flow description file includes one or more comments;

wherein the code generator is operable to generate said one or more source code files including said one or more comments.

7. The computer system of claim 1, wherein the code generator is operable to generate target documentation in response to the code flow description file.

8. The computer system of claim 1, wherein the one or more source code files comprise a plurality of source code example files for an application program.

9. A computer implemented method for generating one or more source code files in a computer system, the computer system comprising a CPU and memory, the method comprising:

generating a code flow description file in response to user input, wherein the code flow description file is written in a code flow description language, wherein the code flow description language includes common programming elements from said plurality of programming languages;

receiving user input indicating one or more target programming languages; and generating one or more source code files in the one or more target programming languages in response to the code flow description file, wherein said generating includes:

parsing the code flow description file to produce a code flow description data structure; and generating said one or more source code files in said one or more target programming languages in response to said code flow description data structure;

wherein said generating the code flow description file further comprises accessing functions of said application program written in said code flow description language from a function database.

10. The method of claim 9, wherein the code flow description file includes a plurality of code flow segments;

wherein said parsing comprises parsing each of said code flow segments, thereby producing a code flow description data structure for each of said code flow segments;

wherein said generating generates said one or more source code files in said one or more target programming languages in response to said code flow description data structures corresponding to each of said code flow segments.

11. The method of claim 9, wherein, for each of said one or more target programming languages, said generating generates a source code file using syntax rules of said target programming language.

12. The method of claim 9, wherein said plurality of target programming languages include one or more from the group comprising: C, Visual Basic, and LabWindows/CVI.

13. The method of claim 9, wherein said generating the code flow description file further comprises executing a program flow editor to create said code flow description file utilizing said code flow description language.

14. The method of claim 9, wherein said code flow description language includes a syntax for specifying comments;

wherein said code flow description file includes one or more comments;

wherein said generating generates the one or more source code files including said one or more comments.

15. The method of claim 9, further comprising:

generating target documentation in response to the code flow description file.

16. The method of claim 9, wherein the one or more source code files comprise a plurality of source code example files for an application program.

17. A memory media which stores program instructions for generating one or more source code files in a computer system, the computer system comprising a CPU and memory, wherein the program instructions are executable to implement:

receiving user input indicating one or more target programming languages;

generating a code flow description file, wherein the code flow description file is written in a code flow description language, wherein the code flow description language includes common programming elements from said plurality of programming languages; and generating one or more source code files in the one or more target programming languages in response to the code flow description file, wherein said generating includes:

parsing the code flow description file to produce a code flow description data structure; and generating said one or more source code files in said one or more target programming languages in response to said code flow description data structure;

wherein the one or more source code files comprise a plurality of source code example files for an application program;

wherein the memory media stores a function database which stores functions of said application program written in said code flow description language; and wherein said generating the code flow description file further comprises accessing functions of said application program written in said code flow description language from said function database.

18. The memory media of claim 17, wherein the memory media stores a program flow editor which is operable for creating said code flow description file utilizing said code flow description language;

wherein said generating the code flow description file further comprises executing the program flow editor to create said code flow description file utilizing said code flow description language.

19. A computer system configured to generate source code files, the computer system comprising:

a CPU;

a system memory coupled to the CPU, wherein the system memory comprises:

a code flow description file, wherein the code flow description file is written in a code flow description language, wherein the code flow description language includes common programming elements from said plurality of programming languages;

a code generator which is operable to receive user input indicating a plurality of target programming languages, wherein the code generator is operable to examine the code flow description file and generate a plurality of source code files in said plurality of target programming languages; and a function database stored in the memory of the computer system which stores functions of said application program written in said code flow description language;

wherein said function database is useable in creating said code flow description file.

20. The computer system of claim 19, wherein the code generator is operable to parse the code flow description file to produce a code flow description data structure;

wherein the code generator is operable to generate said plurality of source code files in said plurality of target programming languages in response to said code flow description data structure.

21. The computer system of claim 20, wherein the code flow description file includes a plurality of code flow segments, wherein the code generator is operable to parse each of said code flow segments and produce a code flow description data structure for each of said code flow segments;

wherein the code generator is operable to generate said plurality of source code files in said plurality of target programming languages in response to said code flow description data structures corresponding to each of said code flow segments.

22. The computer system of claim 19, wherein, for each of said plurality of target programming languages, the code generator is operable to generate said plurality of source code files using syntax rules of said target programming language.

23. The computer system of claim 19, wherein said plurality of target programming languages include one or more from the group comprising: C, Visual Basic, and LabWindows/CVI.

24. The computer system of claim 19, further comprising:

a program flow editor stored in the memory of the computer system which is operable for creating said code flow description file utilizing said code flow description language.

25. The computer system of claim 19, wherein said code flow description language includes a syntax for specifying comments;

wherein said code flow description file includes one or more comments;

wherein the code generator is operable to generate said plurality of source code files including said one or more comments.

26. The computer system of claim 19, wherein the code generator is operable to generate target documentation in response to the code flow description file.

27. The computer system of claim 19, wherein the plurality of source code files comprise source code example files for an application program.

28. A computer implemented method for generating source code files in a computer system, the computer system comprising a CPU and memory, the method comprising:

generating a code flow description file in response to user input, wherein the code flow description file is written in a code flow description language, wherein the code flow description language includes common programming elements from said plurality of programming languages;

receiving user input indicating a plurality of target programming languages; and generating a plurality of source code files in the plurality of target programming languages in response to the code flow description file;

wherein said generating the code flow description file further comprises accessing functions of said application program written in said code flow description language from a function database.

29. The method of claim 28, wherein said generating the plurality of source code files includes:

parsing the code flow description file to produce a code flow description data structure;

generating said plurality of source code files in said plurality of target programming languages in response to said code flow description data structure.

30. The method of claim 29, wherein the code flow description file includes a plurality of code flow segments;

wherein said parsing comprises parsing each of said code flow segments, thereby producing a code flow description data structure for each of said code flow segments;

wherein said generating generates said plurality of source code files in said plurality of target programming languages in response to said code flow description data structures corresponding to each of said code flow segments.

31. The method of claim 28, wherein, for each of said plurality of target programming languages, said generating generates said plurality of source code files using syntax rules of said target programming language.

32. The method of claim 28, wherein said plurality of target programming languages include one or more from the group comprising: C, Visual Basic, and LabWindows/CVI.

33. The method of claim 28, wherein said generating the code flow description file further comprises executing a program flow editor to create said code flow description file utilizing said code flow description language.

34. The method of claim 28, wherein said code flow description language includes a syntax for specifying comments;

wherein said code flow description file includes one or more comments;

wherein said generating generates the plurality of source code files including said one or more comments.

35. The method of claim 28, further comprising:

generating target documentation in response to the code flow description file.

36. The method of claim 28, wherein the plurality of source code files comprise source code example files for an application program.

37. A memory media which stores program instructions for generating source code files in a computer system, the computer system comprising a CPU and memory, wherein the program instructions are executable to implement:

receiving user input indicating one or more target programming languages;

generating a code flow description file, wherein the code flow description file is written in a code flow description language, wherein the code flow description language includes common programming elements from said plurality of programming languages; and generating a plurality of source code files in the plurality of target programming languages in response to the code flow description file;

wherein the memory media stores a function database which stores functions of said application program written in said code flow description language; and wherein said generating the code flow description file further comprises accessing functions of said application program written in said code flow description language from said function database.

38. The memory media of claim 37, wherein said generating the plurality of source code files includes:

parsing the code flow description file to produce a code flow description data structure;

generating said plurality of source code files in said plurality of target programming languages in response to said code flow description data structure.

39. The memory media of claim 37, wherein the memory media stores a program flow editor which is operable for creating said code flow description file utilizing said code flow description language;

wherein said generating the code flow description file further comprises executing the program flow editor to create said code flow description file utilizing said code flow description language.

* * * * *